June 19, 1923. Re. 15,633

M. E. HAMILTON ET AL

AUTOMATIC TRAIN SPEED CONTROL

Original Filed Feb. 9, 1920 2 Sheets-Sheet 1

INVENTORS
Maurice E. Hamilton
William H. Johnson,
BY
Arthur M. Hood.
ATTORNEY

June 19, 1923. Re. 15,633

M. E. HAMILTON ET AL

AUTOMATIC TRAIN SPEED CONTROL

Original Filed Feb. 9, 1920 2 Sheets-Sheet 2

INVENTORS
Maurice C. Hamilton
William H. Johnson,
BY
Arthur M. Hood.
ATTORNEY

Reissued June 19, 1923. Re. 15,633

UNITED STATES PATENT OFFICE.

MAURICE E. HAMILTON, OF NEW YORK, N. Y., AND WILLIAM H. JOHNSON, OF TERRE HAUTE, INDIANA.

AUTOMATIC TRAIN-SPEED CONTROL.

Original No. 1,443,959, dated March 20, 1923, Serial No. 357,217, filed February 9, 1920. Application for reissue filed April 19, 1923. Serial No. 633,221.

*To all whom it may concern:*

Be it known that we, MAURICE E. HAMILTON and WILLIAM H. JOHNSON, citizens of the United States, residing, respectively, at New York city, State of New York, and Terre Haute, in the county of Vigo and State of Indiana, have invented a new and useful Automatic Train-Speed Control, of which the following is a specification.

It has heretofore been proposed to provide automatic mechanism by means of which the brakes of a railroad train, trolley car, etc., will be automatically applied with a "service" application whenever the speed exceeds a predetermined rate, but such devices have not proven entirely satisfactory, for the reason that even though they be so formed as to be locked from manipulation by the engine driver, their brake-applying functions could be avoided by the driver by carrying the usual engineer's valve to so-called release position.

The object of our present invention is, therefore, to provide automatic mechanism of such character that, when the train has reached a predetermined speed, the brakes will be automatically set and communication between the main reservoir, or air supply, of the brake system and the train line (brake pipe), preferably through the engineer's valve, be disestablished so long as the speed of the train shall be equal to the prohibited maximum.

Figure 1:
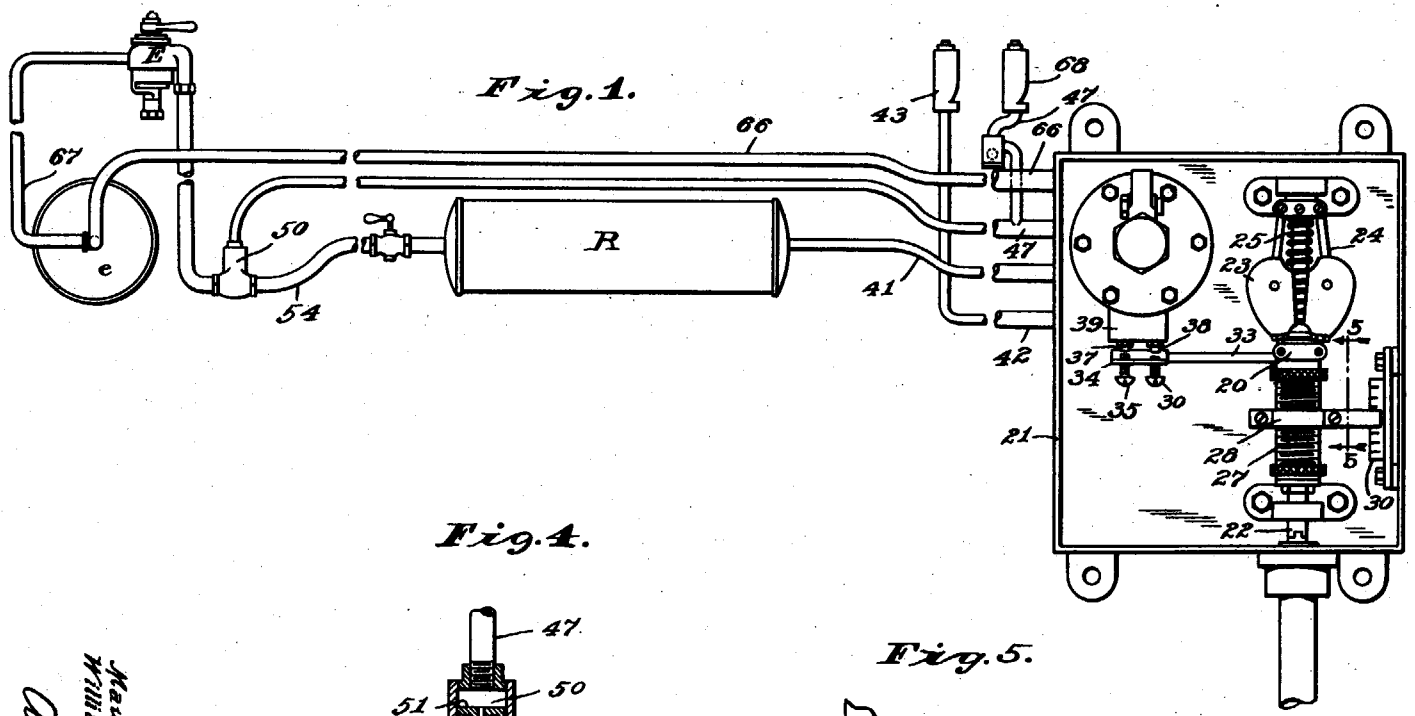
Figure 4:
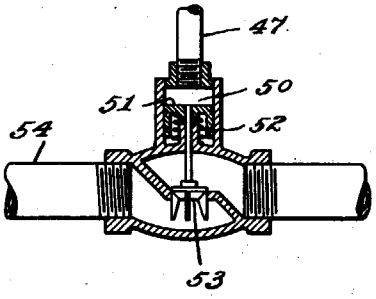
Figure 5:
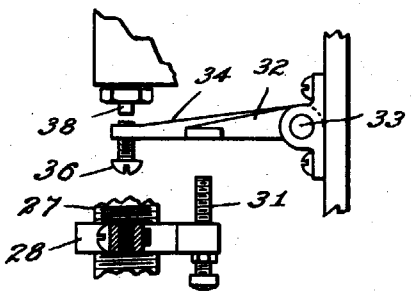
Figure 3:
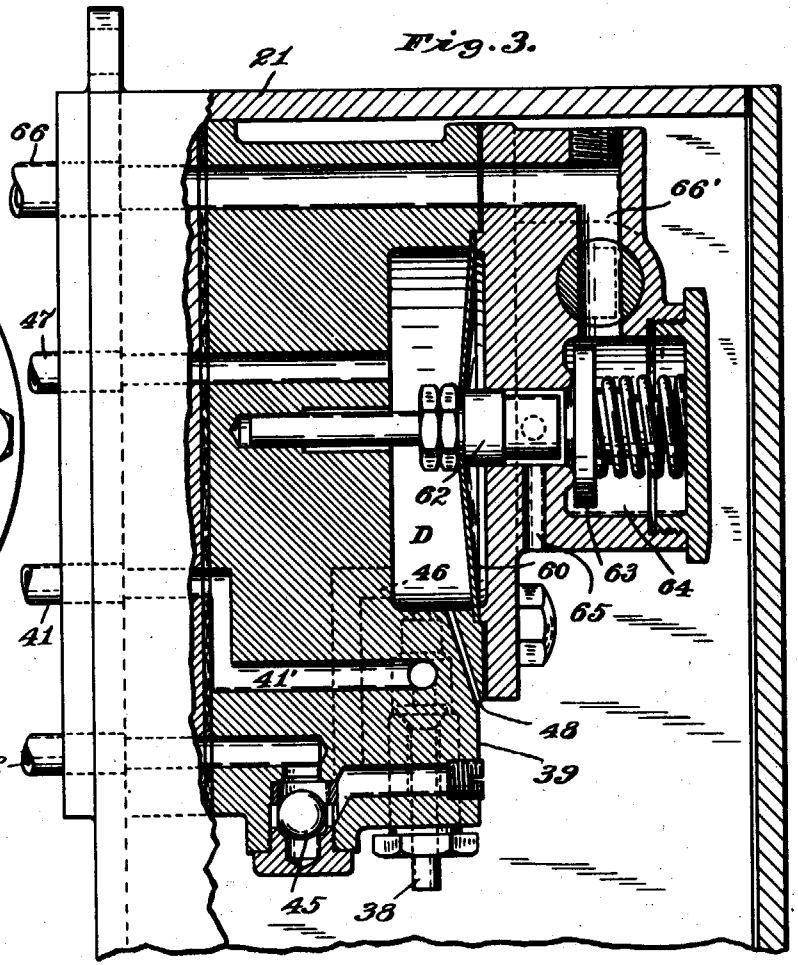
Figure 2:
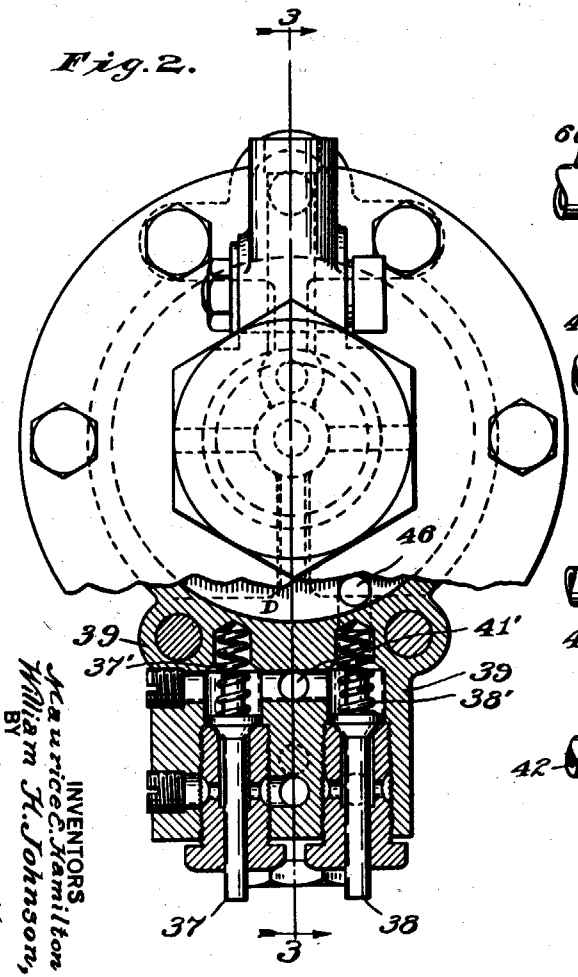

The accompanying drawings illustrate our invention. Fig. 1 is a diagram of the said instrument and those portions of the standard equipment of an air brake system, necessary for an understanding of our invention; Fig. 2 is an elevation in partial vertical section of the main instrument of our invention; Fig. 3 is a section on line 3—3 of Fig. 2; Fig. 4 is a section of control valve in the reservoir delivery line; and Fig. 5 is a fragmentary detail on line 5—5 of Fig. 1, on a larger scale. In the main, the automatic speed control instrument is substantially like that shown in our Patent 1,277,718, differing therefrom, however, in some particulars which will become apparent by the description.

In the drawings, 21 indicates a suitable enclosing casing which can be locked against access. Within this casing is journaled a shaft 22 adapted to be driven, by any suitable connections, from a rotating part of the engine. Shaft 22 carries an ordinary ball governor, comprising balls 23, links 24, spring 25, sliding head 26 which carries an externally threaded sleeve 27 axially movable on shaft 22 and capable of rotation relative to head 26. Mounted upon the sleeve 27 and having a threaded engagement therewith, is a cross arm 28 held against rotation by a guideway 30 and carrying a temper screw 31. Arranged in the path of movement of the temper screw 31, due to upward movement of sleeve 27, enforced by balls 23, is a lever 32, on a shaft 33 carrying an arm 34 provided with two temper-screws 35 and 36 arranged to come successively into contact with the stems of two valves 37 and 38 respectively mounted in a valve casing 39, the arrangement being such that upward movement of levers 32 from the position indicated in Fig. 1 first opens valve 37 and then opens valve 38. Valves 37 and 38 are normally held closed by springs 37′ and 38′ respectively, and by air pressure when the system is charged, or is being charged. Valve 37 controls communication between a pipe 41, which leads from the main reservoir R of the air brake system through passage 41′ in casing 39, and a pipe 42 which forms an outlet to atmosphere through a suitable whistle 43.

In order to prevent continued sounding of the whistle 43 when valve 37 is opened, we arrange a normally-open check valve 45 in the passage leading to pipe 42, in such manner that the outflow of air released by valve 37, will close the check valve and prevent further outflow, the air passing the check valve having to pass out through pipe 42 and sound the whistle 43.

Valve 38 controls flow of air from pipe 41 to a passage 46 which leads into a diaphragm chamber D having an outlet pipe 47 and a small bleed passage 48. Pipe 47 leads to a cylinder 50 within which is mounted a piston 51 normally moved upwardly by a spring 52. Piston 51 carries a valve 53 which controls flow of air from the main reservoir R through pipe 54 to the engineer's valve E, free flow of air from the main reservoir R being unobstructed by valve 53 under normal conditions.

One wall of chamber D is formed by a diaphragm 60 which is normally dished inwardly, as shown in Fig. 3. This diaphragm carries a head 62 adapted to contact with a valve 63 which normally closes outlet from a chamber 64 to the atmosphere through the passage 65. Leading into chamber 64 is a passage 66′ connected to a pipe 66 leading from the usual equalizing reservoir *e* which forms part of the air brake system and is connected to the usual engineer's valve by pipe 67.

Pipe 47 also leads to a whistle 68 through a check valve similar in construction and action to check valve 45.

The operation is as follows: The governor shaft 22 is continuously rotated as the train moves and the governor balls 23 fly out in the usual manner as the speed increases, thus raising cross arm 28 and moving screw 31 toward lever 32. So long as the maximum speed, for which the apparatus is set, is not closely approached, our device does not function upon the brakes, but as soon as the prohibited maximum is closely approached, screw 35 engages and opens valve 37, whereupon there is a slight flow of air from the main reservoir R through pipes 41 and 42 to whistle 43, valve 45 operating to limit the sounding signal to a short period. If the engineer fails to heed the warning given by whistle 43 and does not reduce the speed of the train, screw 36 comes into contact with and opens valve 38. Upon the opening of this valve 38, air flows from the main reservoir R into chamber D and flows from thence out through the small bleed opening 48 to atmosphere and through pipe 47 to whistle 68 sounding this whistle. The accumulation of air in chamber D operates first to push diaphragm 60 outwardly and take up the slight slack between said diaphragm and valve 63, so that there may be a premonitory sounding of whistle 68 before any opening of valve 63. If, however, the speed of the train is not promptly reduced, and valve 38 remains open, the pressure in the chamber D will increase to a point sufficient to cause diaphragm 61 to drive valve 63 from its seat, thus opening a passage through pipe 66 from the equalizing reservoir *e* (or train line) and causing a train line pressure reduction, similar to that produced by a movement of the engineer's valve to service position, reducing the equalizing chamber pressure and thus causing a movement of the interior portions of the engineer's valve to produce an exhaust from train line, thereby operating to set the brakes with a service application, the character of this service application being varied according to the duration of bleeding of the equalizing reservoir pressure through valve 63, as in the case of corresponding bleeding of the equalizing reservoir pressure through the normal actuation of the engineer's valve.

The accumulation of pressure in chamber D passes through pipe 47 to cylinder 50 and, as piston 51 considerably exceeds in area the area of valve 53, said valve 53 is driven to its seat, so as to close communication from the main reservoir to the train line through the engineer's valve E. As a consequence, the engineer may not, by throwing his engineer's valve to release position, recharge the train line and the equalizing chamber and reservoir *e* and thereby release the brakes, as he might do, in spite of automatic operation of the mechanism which we have described, if the automatically operated cut off valve 53 were not provided. As soon as the speed of the train is reduced below the prohibited maximum, valve 38 is closed automatically by its spring and the pressure within chamber D passes out through the bleed passages 48, whereupon valve 63 returns to its seat and valve 53 is retracted from its seat, so that the brakes will be released in the regular and ordinary manner upon a re-charging of the train line and equalizing reservoir in the usual manner. If the speed reduction has been due solely to the automatic application of the brakes and the engineer has refrained from reducing the motive power, it will be apparent that immediately upon the automatic release of the brakes, in the manner described, the speed of the train will again increase and there will be a repeated automatic application of the brakes, in the manner already described, but that if following the automatic application of the brakes, the engineer reduces the motive power, or the speed decreased because of road conditions, so that the prohibited maximum is not exceeded at the time of the automatic release of the brakes, our apparatus will remain quiescent until the prohibited maximum is again reached, whereupon, the automatic operation is repeated.

It will be apparent from the above description that our invention consists broadly in the provision:

(*a*) Of means by which the train line pressure controlling mechanism may be manipulated, preferably in the manner of its manipulation through the manual manipulation of the engineer's valve.

(*b*) Of means by which the flow of air to train line from the main reservoir or air supply may be automatically controlled, and (*c*) Of speed controlled means by which elements (*a*) and (*b*) may be automatically controlled, whereby all possibility of any interference by the engineer with the automatic application of the brakes and maintenance of braking action whenever the prohibited maximum speed is reached, may be prevented.

It will be understood that bleeding of the equalizing reservoir is equivalent to bleeding the train-line, and that connection is made to the equalizing chamber principally for structural convenience and in order to utilize the internal mechanism of the engineer's valve in obtaining automatic service application of the brakes. Wherever reference is made in the claims to the equalizing reservoir, that reference is to be interpreted as including "train line." "Main reservoir" includes any suitable air-supply.

It will also be understood that the function of valve 53 is to prevent any improper recharging of train-line and that any placing of this valve to accomplish this result will be within the invention.

We claim as our invention:

1. The combination in an air brake system, of the main reservoir, the engineer's valve, a valve controlling outflow from the equalizing reservoir, a valve controlling flow from the main reservoir to the equalizing reservoir, speed-controlled means, and means actuated by said speed-controlled means for opening the second-mentioned valve and closing the third-mentioned valve upon the attainment of a desired maximum position by the speed-controlled means.

2. The combination in an air brake system of a main reservoir, an equalizing reservoir, an engineer's valve, means for causing an application of brakes independent of manual manipulation of the engineer's valve, means for closing communication between the main reservoir and the equalizing reservoir, a speed controlled member, and means actuated by said speed-controlled member for causing operation of the said independent brake-applying mechanism and for closing communication between the main reservoir and the equalizing reservoir upon such application of the brakes.

3. The combination, in an air brake system, of a manually-manipulable means for controlling train line pressure, means operating through said manually-manipulable means for restoring train line pressure, and speed-controlled means for causing train line pressure reduction and for closing communication between the pressure-restoring means and the manually-manipulable means.

4. The combination, in a brake system, of a main reservoir, an equalizing reservoir, an engineer's valve communicating with the equalizing reservoir and the main reservoir, a normally open pneumatically actuated valve for closing communication between the main reservoir and the engineer's valve, a normally closed pneumatically actuated discharge valve for discharging air from the equalizing chamber, a connection between the main reservoir and the pneumatic actuators for said pneumatically-actuated valves, means for normally closing communication between the main reservoir and said pneumatic actuators, and speed-controlled means for opening said last-mentioned normally-closed communication upon the attainment of a predetermined speed by said speed-controlled means.

5. The combination in an air brake system of a pneumatic signal, a connection between said pneumatic signal and an air supply, a normally closed valve controlling communication between the air supply and signal, speed-control means for opening said valve upon the attainment of a predetermined maximum, and a check valve arranged in the connection between the air supply and the signal, said check valve permitting a limited initial outflow to the signal and closing under the action of said outflow.

6. The combination in an air brake system, of the main reservoir, the equalizing reservoir, the engineer's valve, a valve controlling outflow from the equalizing reservoir, a valve independent of manual control by the driver controlling flow from the main reservoir to the equalizing reservoir, speed-controlled means, and means actuated by said speed-controlled means for opening the second mentioned valve and closing the third-mentioned valve upon the attainment of the desired maximum position by the speed-controlled means.

7. The combination in an air brake system, of the main reservoir, the equalizing reservoir, the engineer's valve, a normally open valve in the connection between the main reservoir and equalizing reservoir, a pneumatically actuated piston connected with said last-mentioned valve for closing the same, a normally closed valve inaccessible to manual manipulation, controlling an exhaust passage from the equalizing chamber, a pneumatically actuated member for opening said last-mentioned valve, a pneumatic connection between said pneumatically actuated member and the main reservoir, a controlling valve in said connection, speed controlled means for actuating said last-mentioned valve, and a pneumatic connection between the aforesaid piston and the pneumatic connection between the pneumatically actuated member and the main reservoir on the delivery side of the controlled valve.

8. The combination in an air brake system, of the main reservoir, the engineer's valve, a valve controlling outflow from the train-line, a valve controlling flow from the main reservoir to the train-line, speed-controlled means, and means actuated by said speed-controlled means for opening the second-mentioned valve and closing the third-mentioned valve upon the attainment of a desired maximum position by the speed-controlled means.

9. The combination in an air brake system, of the main reservoir, the equalizing reservoir, the engineer's valve, a valve controlling outflow from the equalizing reservoir, a valve controlling flow from the main reservoir to the equalizing reservoir through the engineer's valve, speed-controlled means, and means actuated by said speed-controlled means for opening the second-mentioned valve and closing the third-mentioned valve upon the attainment of a desired maximum position by the speed-controlled means.

10. The combination in an air brake system of a main reservoir, an engineer's valve, means for causing an application of brakes independent of manual manipulation of the engineer's valve, means for closing communication between the main reservoir and the train line, a speed-controlled member, and means actuated by said speed-controlled member for causing operation of the said independent brake-applying mechanism and for closing communication between the main reservoir and the train line upon such application of the brakes.

11. The combination in an air brake system of a main reservoir, an equalizing reservoir, an engineer's valve, means for causing an application of brakes independent of manual manipulation of the engineer's valve, means for closing communication between the main reservoir and the equalizing reservoir through the engineer's valve, a speed controlled member, and means actuated by said speed-controlled member for causing operation of the said independent brake-applying mechanism and for closing communication between the main reservoir and the equalizing reservoir through the engineer's valve upon such application of the brakes.

12. The combination in a brake system, of a main reservoir, an engineer's valve communicating with the train line and the main reservoir, a normally open pneumatically actuated valve for closing communication between the main reservoir and the engineer's valve, a normally closed pneumatically actuated discharge valve for discharging air from the train line, a connection between the main reservoir and the pneumatic actuators for said pneumatically-actuated valves, means for normally closing communication between the main reservoir and said pneumatic actuators, and speed-controlled means for opening said last-mentioned normally-closed communication upon the attainment of a predetermined speed by said speed-controlled means.

13. The combination in an air brake system, of the main reservoir, the engineer's valve, a valve controlling outflow from the train-line, a valve independent of manual control by the driver controlling flow from the main reservoir to the train-line, speed-controlled means, and means actuated by said speed-controlled means for opening the second-mentioned valve and closing the third-mentioned valve upon the attainment of the desired maximum position by the speed-controlled means.

14. The combination in an air brake system, of the main reservoir, the engineer's valve, a normally open valve in the connection between the main reservoir and train-line, a pneumatically actuated piston connected with said last-mentioned valve for closing the same, a normally closed valve inaccessible to manual manipulation, controlling an exhaust passage from the train-line, a pneumatically actuated member for opening said last-mentioned valve, a pneumatic connection between said pneumatically actuated member and the main reservoir, a controlling valve in said connection, speed controlled means for actuating said last-mentioned valve, and a pneumatic connection between the aforesaid piston and the pneumatic connection between the pneumatically actuated member and the main reservoir on the delivery side of the controlled valve.

MAURICE E. HAMILTON.
WILLIAM H. JOHNSON.